C. DRAKE.
CLAMP.
APPLICATION FILED FEB. 10, 1920.

1,363,852.   Patented Dec. 28, 1920.

WITNESSES
AC Bedell
SW Foster

INVENTOR
CHARLES DRAKE.
BY
ATTORNEYS

UNITED STATES PATENT OFFICE.

CHARLES DRAKE, OF MANNINGTON, WEST VIRGINIA.

CLAMP.

1,363,852.   Specification of Letters Patent.   Patented Dec. 28, 1920.

Application filed February 10, 1920. Serial No. 357,619.

*To all whom it may concern:*

Be it known that I, CHARLES DRAKE, a citizen of the United States, and a resident of Mannington, in the county of Marion and State of West Virginia, have invented new and Improved Clamps, of which the following is a full, clear, and exact description.

This invention relates to improvements in clamps, an object of the invention being to provide a clamp which can be conveniently secured around a post and which will support girders and braces which are rigidly secured thereto.

A further object is to provide a clamp which is especially adapted for use in metal frame structures and is adapted to clamp posts or standards of tubular or cylindrical form and provide a secure and convenient means for connecting the braces and girders to the post.

With these and other objects in view the invention consists in certain novel features of construction, and combinations and arrangements of parts as will be more fully hereinafter described and pointed out in the claims.

In the accompanying drawings—

Figure 1:
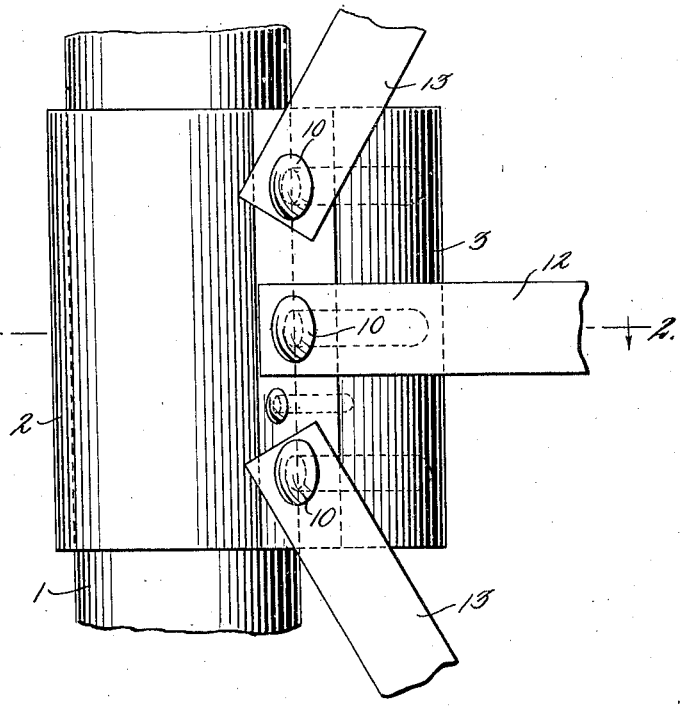
Figure 1 is a view in side elevation illustrating my improved clamp in operative position.
Figure 2:
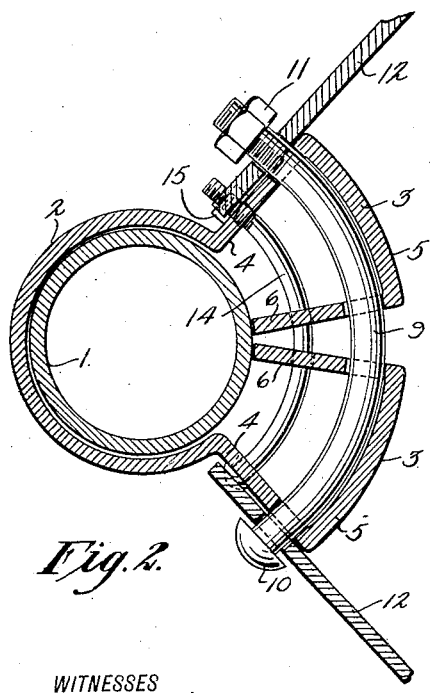
Fig. 2 is a view in section on the line 2—2 of Fig. 1, showing the clamp in its released or spread position.
Figure 3:
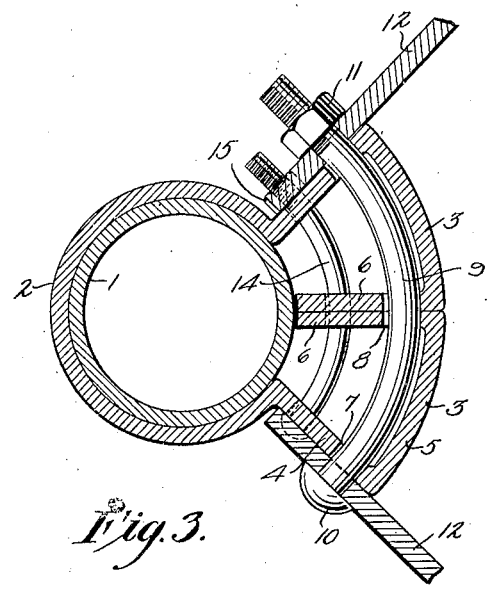
Fig. 3 is a view similar to Fig. 2 showing the device in its clamped or gripping position.

1 represents a tubular post, or leg, or other frame member, around which my improved clamp 2 is secured. My improved clamp is preferably of spring metal of the necessary thickness and width and constitutes in the main a curved metal strap which fits around the greater portion of the post 1 and is provided at its ends with integral hollow segments 3, 3. These segments 3, 3, are formed by bending the ends of the metal strap constituting the clamp. These ends are first bent outwardly forming webs 4. They are then curved toward each other concentrically with the curvature of the post 1, as shown at 5, and are then bent inwardly forming radial webs 6 so that the webs 4 and 6 and the outer curved connecting portions 5 constitute integral hollow segments at the ends of the clamp.

The webs 4 and 6 are provided with openings 7 and 8 respectively receiving curved bolts 9, the latter having heads 10 at one end and nuts 11 at their other ends or threads and nuts at both ends for clamping the segments together to secure the clamp around the post. These bolts 9 also operate as coupling devices to connect girders 12 and braces 13 to the clamp so that the clamp functions as a supporting bracket to provide a firm coupling means for connecting the post with other portions of the frame or structure of which the posts are designed as a part.

It is to be understood that the girders and braces are at the outer faces of the segments so that when the segments are together, a triangular, rectangular, or other many sided frame structure can be conveniently provided with the posts 1 at the angles of the structure.

To clamp or partially clamp the device on the post 1 before the braces and girders are connected thereto, I find it desirable to provide a bolt 14 which is positioned through the webs and provided with a nut 15 at its ends. This bolt 14 may be smaller than the other bolts as it is not necessary to provide a great deal of strength therefor as it is simply desirable to hold the clamp sufficiently to prevent its accidental movement during the assemblage of parts.

While I have illustrated three bolts 9 and coöperating connecting devices, it is obvious that the invention is not limited to any particular number of bolts, nor to the number and character of devices connected to the webs, and hence I do not limit myself to the precise details set forth, but consider myself at liberty to make such changes and alterations as fairly fall within the spirit and scope of the appended claims.

I claim:

1. A clamp, comprising a curved metal strip, hollow segments at the ends of the strip, and securing devices connecting the segments.

2. A clamp, comprising a curved metal strip, hollow segments at the ends of the strip, said segments having holes therein, curved bolts in said holes, and nuts on the ends of the bolts.

3. A clamp, comprising a curved metal strip, hollow segments at the ends of the strips forming supporting brackets, bolts projected through the segments, girders and braces located on the ends of the bolts, and nuts screwed onto the bolts securing the girders and braces to the segments and operating as a securing means for the clamp.

4. A clamp of the character described, comprising a spring metal strip having its intermediate portion curved, the ends of said strip projected outwardly, curved toward each other and then projected inwardly forming hollow segments at the ends of the strip with the end faces of the segments forming webs radially positioned relative to the curved intermediate portion of the clamp, and securing devices projected through said webs.

5. The combination with a post, a clamp on the post, hollow webs on the ends of the clamp, girders and braces at the outer faces of said segments, bolts securing said segments together and clamping the girders and braces thereto, and an additional bolt projected through the segments and having a nut thereon, said additional bolt adapted to operate as a preliminary clamping means to hold the clamp on the post.

CHARLES DRAKE.